United States Patent [19]

Anderson et al.

[11] Patent Number: 5,039,740
[45] Date of Patent: Aug. 13, 1991

[54] FATTY ACID-MODIFIED POLYESTER RESIN COMPOSITION

[75] Inventors: Eugene Anderson, Brooklyn Park; Raymond M. Mooney, Plymouth, both of Minn.

[73] Assignee: The Valspar Corporation, Minneapolis, Minn.

[21] Appl. No.: 427,969

[22] Filed: Oct. 26, 1989

Related U.S. Application Data

[63] Continuation of Ser. No. 176,598, Apr. 1, 1988, abandoned.

[51] Int. Cl.$^5$ .............................................. C08L 67/08
[52] U.S. Cl. ...................................... 525/7.1; 525/7.0
[58] Field of Search ................................. 525/7.0, 7.1

[56] References Cited

U.S. PATENT DOCUMENTS

| | | | |
|---|---|---|---|
| 4,094,835 | 6/1978 | Omori | 525/7.1 |
| 4,100,120 | 7/1978 | Maekawa et al. | 260/22 CB |
| 4,104,830 | 3/1977 | Rumfield | 260/22 CB |
| 4,111,871 | 9/1978 | Aritomi | 260/22 CB |
| 4,147,675 | 4/1979 | Aritomi | 260/22 CB |
| 4,217,257 | 8/1980 | Kuzma | 260/22 CB |
| 4,224,202 | 9/1980 | Heiberger | 260/22 CB |
| 4,225,473 | 9/1980 | Heiberger | 260/22 CB |
| 4,511,692 | 4/1985 | Anderson et al. | 525/7 |

OTHER PUBLICATIONS

Martens, *Alkyd Resins* Reinhold Publishing Corp. N.Y. p. 30 1961.

*Primary Examiner*—Patricia Short
*Attorney, Agent, or Firm*—James R. Haller; Gregory P. Kaihoi; Mary P. Bauman

[57] ABSTRACT

An alkyd resin coating composition having reduced solvent requirements and excellent physical and cure properties is obtained by blending together a fatty acid-modified polyester resin and an addition-polymerizable monomer or oligomer characterized by vinyl unsaturation and capable of undergoing addition polymerization under free radical initiating conditions.

37 Claims, No Drawings

FATTY ACID-MODIFIED POLYESTER RESIN COMPOSITION

This application is a continuation of application Ser. No. 176,598, filed 4/1/88, now abandoned.

BACKGROUND OF THE INVENTION

The present invention relates to a novel polyester coating composition characterized by having a lower solvent requirement for attaining a coating viscosity, improved physical properties, and a better cure response than polyester resin compositions currently available.

Oil-modified alkyd (polyester) resins have long been used in the paint industry, and generally are prepared by the reaction of polybasic organic acids, polyhydric alcohols and unsaturated fatty acids. The "oil length" of an oil modified alkyd resin may be defined as the weight percent of the resin contributed by the aliphatic, "fatty" chains of the fatty acids. As pointed out in U.S. Pat. No. 4,111,871 (Aritomi), the oil length of an alkyd resin is important to the physical properties of the paint or coating which the resin forms. Oil length affects solubility, hardness, gloss, color preserving ability, weather resistance, hardening time and storage life of the paints made from alkyd resins. Increasing the oil length is reported in U.S. Pat. No. 4,111,871 to enhance the flexibility of the resulting film, to increase its solubility in organic solvents, and to decrease film hardness. Reduction in oil length is said to enhance gloss and color preserving ability of the film.

The above-mentioned U.S. Pat. No. 4,111,871 describes a resin composition which comprises an oil-modified alkyd resin and an acrylate or methacrylate monoester of an alcohol. The resulting resin composition is a liquid and is said to be usable without the addition of solvent. Of importance, the oil length of the oil-modified alkyd resin must necessarily be at least 40% to avoid inferior waterproofness of the initial film coating. Aritomi U.S. Pat. No. 4,147,675 shows the use of oil-modified alkyd resins when combined with sorbic, crotonic or 2(beta-furyl) acrylic acids.

U.S. Pat. Nos. 4,224,202 and 4,225,473 (Heiberger) refer to high-solids coating compositions containing an unsaturated fatty acid alkyd resin, an alkyl dimethacrylate or trimethacrylate monomer, a protected cobalt oxime catalyst, a polar solvent and a peroxide. The oil length of the alkyd resin disclosed in these references exceeds 40%.

U.S. Pat. No. 4,014,830 (Rumfield) discusses an acrylate or methacrylate modified alkyd resin or epoxy ester which contains a small amount (up to 10% by weight) of an acrylate or methacrylate ester of a polyol and which is characterized by rapid drying.

Commercially available alkyd resin coating compositions which have excellent physical properties and cure responses commonly are quite viscous and accordingly require, for proper coating, a substantial amount of solvent such as methyl propyl ketone, xylene or butyl acetate, and such resin compositions commonly have volatile organic contents ("VOC"), primarily due to organic solvents, of 3.5 lbs./gallon (420 g/l) and above. Alkyd coating compositions which require less solvent to attain a coating viscosity generally suffer from poorer physical properties and poorer cure responses.

Conventional and high solids industrial alkyd resins may have oil lengths on the order of 20 to 50% and commonly must be dissolved in aromatic and oxygenated solvents to be used as air dried paints or oven cured paints.

Difficulty has been experienced in achieving high solids coatings that have the low viscosities necessary for industrial applications. A major factor involves the molecular weight of the alkyd resin. Generally speaking, increasing the molecular weight of an alkyd resin generally improves physical characteristics of a coating made from the resin and decreases the coating drying time; that is, the time required for the coating to dry sufficiently so that it can be handled without damage. However, increasing the molecular weight also increases the amount of solvent needed to achieve a viscosity appropriate for coating applications. The amount of solvent that is needed to provide the desired coating viscosity may be reduced by increasing the oil length of the alkyd. However increasing the oil length increases the drying time.

It would be highly desirable to prepare alkyd resin coating compositions which have relatively low solvent concentrations and which yet exhibit good coating properties and excellent physical and cure response properties.

SUMMARY OF THE INVENTION

We have found that polyester (e.g., alkyd) resin coating compositions having reduced solvent requirement and excellent physical and cure properties can be obtained by blending together from about 15% to about 85% (preferably about 50%–80%) by weight, based upon the weight of the blend, of a fatty acid-modified polyester resin having an oil length of not greater than about 27%, and from about 85% to about 15% (preferably about 20–50%) by weight of an addition-polymerizable monomer or oligomer characterized by vinyl unsaturation and capable of undergoing addition polymerization under free radical initiating conditions.

In another embodiment, an alkyd resin coating composition is provided that comprises a blend of from about 15% to about 85% (preferably about 50%–80%) by weight, based upon the weight of the blend, of a fatty acid-modified polyester resin having an oil length not greater than about 35% and the resin being substantially free of pendant groups providing alpha-beta ethylenic unsaturation; and from about 85% to about 15% (preferably about 20%–50%) by weight, based on the weight of the blend, of a monomer or oligomer having vinyl unsaturation and capable of undergoing addition polymerization under free radical-initiating conditions.

In yet another embodiment, a one-part coating composition is provided that comprises a blend of from about 15% to about 85% (preferably about 50%–80%) by weight, based on the weight of the blend, of a fatty acid-modified polyester resin having hydroxyl functionality; from about 85% to about 15% (preferably about 20%–50%) by weight, based on the weight of the blend, of a monomer or oligomer having vinyl unsaturation and capable of undergoing addition polymerization under free radical-initiating conditions; and an effective quantity of free-radical initiator to initiate addition polymerization of said monomer or oligomer, the initiator comprising a room temperature stable azo free radical initiator, or a room temperature stable peroxide initiator or both. The free radical initiator may, as desired, contain drying agents and particularly complexed drying agents. Particularly preferred is an initiator comprising a room temperature stable azo free radical initiator and one or more complexed drying agents.

Although the resulting resin compositions can be used with as much solvent as is needed, the solvent concentrations needed to provide coating compositions of appropriate viscosity are exceptionally low. Yet, the physical properties of coatings resulting from the compositions are surprisingly good and the cure response of such compositions is similarly unexpectedly good.

DESCRIPTION OF THE PREFERRED EMBODIMENT

The fatty acid-modified polyester (e.g., alkyd) resins useful in the present invention have oil lengths of not greater than about 35% and preferably in the range of about 15%–30%. Most preferably, the oil lengths of the alkyd resins are in the range of about 20%–27%. The alkyd resins are generally the reaction products of polybasic acids, polyhydric alcohols, and fatty acids which may be unsaturated. The polybasic acids suitable for use in preparation of the alkyd resin constituent are aromatic, aliphatic and alicyclic saturated and unsaturated polybasic acids, and include such acids as phthalic acid, adipic acid, isophthalic acid, terephthalic acid, maleic acid, trimellitic acid, tetrahydrophthalic acid, sebacic acid, napthalic acid, chlorendic acid, heptanedioic acid and succinic acid. Preferred acids include phthalic, isophthalic and maleic acids.

Polyhydric alcohol components are those which can react with the carboxyl groups of polybasic acids in an esterification reaction and which have at least two hydroxyl groups. Examples of suitable alcohols include ethylene glycol, diethylene glycol, glycerin, pentaerythritol, trimethylol ethane, trimethylol propane, neopentyl glycol, propylene glycol, sorbitol, dipropylene glycol, 1,6-hexanediol, 1,3-butylene glycol, dipentaerythritol and triethylene glycol. The preferred polyols are trimethanol ethane, pentaerythritol, neopentyl glycol and propylene glycol.

The fatty acid modifying agent desirably, but not necessarily, is partially unsaturated, and may be supplied as an acid or as an oil containing the acid. The reactive fatty acids have at least one unsaturated site. Suitable fatty acids include linoleic acid, linolenic acid, oleic acid, eleosteric acid, and stearic acid. Generally, useful fatty acids will have molecular weights in the range of about 140 to about 300.

Fatty acids used in the manufacture of alkyds may be derived from biological oils. Oils commonly used in the manufacture of alkyds include tung oil, oiticica oil, dehydrated castor oil, fish oil, linseed oil, safflower oil, soya oil, tall oil acids, cottonseed oil and coconut oil. Particularly useful oils are soya oil and tall oil, which consist of mixtures of suitable fatty acids.

Soya oil, for example, contains about 25% oleic, 51% linoleic, and 9% linolenic acids. The remaining 15% soya fatty acids are saturated. Tall oil comprises about 46% oleic, 41% linoleic, and 3% linolenic acids. The remaining 8% tall oil fatty acids are saturated.

As is well known, alkyds are the reaction products of the esterification reaction between polyols, fatty acid(s) and polybasic acid(s). The typical esterification procedure involves charging these three components to a reaction vessel and reacting at a temperature of around 400°–500° F. Xylene is typically used at 3 to 10% level as a refluxing medium to azeotrope off water from the reaction vessel, the xylene being returned to the reaction vessel. The reaction is considered complete when a certain acid number is reached, e.g., from about 0 to about 55. The acid number is based on the degree of ester bond formation desired. Typically, the alkyd is cooked to 95% or better completed reactions between the three components.

The alkyd usable for the present invention should have an oil length of 15% to 35%, preferably 15–30% and most preferably in the range of about 20% to about 27%. If the oil length is less than 15%, surface cure of the film is poor, resulting in inferior water and chemical resistance and slower drying. If the oil length is over 35%, the hardness of the film decreases, resulting in an initially soft film that is easily damaged when handled.

Any monomer or oligomer which is addition polymerizable and which has vinyl unsaturation can be employed in the invention. However, monomers or oligomers having molecular weights not less than about 200 are preferred. Monomers having molecular weights less than 200 are acceptable, but tend to be somewhat volatile resulting in odor and solids loss by evaporation. Acrylate and methacrylate monomers and oligomers are preferred.

Appropriate vinyl monomers and oligomers include acrylates, methacrylates, allyl-functional compounds, alpha olefins, vinyl ethers, vinyl benzenes and acrylamides, and epoxy and urethane oligomers. Acrylates are typified by isooctyl acrylate, isobornyl acrylate, stearyl acrylate, n-lauryl acrylate, cyclohexyl acrylate, 2-ethoxyethoxyethyl acrylate, 2-phenoxyethyl acrylate, isodecyl acrylate, 1,4-butanediol diacrylate, 1,3-butandiol diacrylate, 1,6-hexanediol diacrylate, diethylene glycol diacrylate, neopentylglycol diacrylate, triethylene glycol diacrylate, tripropylene glycol diacrylate, ethoxylated Bisphenol A diacrylate, trimethylol propane triacrylate, pentaerythritol triacrylate, ethoxylated trimethylol propane triacrylate, propoxylated trimethylol propane triacrylate. The preferred acrylates are stearyl acrylate, tripropylene glycol diacrylate, ethoxylated Bisphenol A diacrylate and trimethylol propane triacrylate. Acrylate oligomers common to the ultraviolet-electron beam industry are also desirable and are the reaction products of an acrylic acid with hydroxyl functional oligomers such as epoxies, polyesters and polyether polyols. Acrylate oligomers also desirable are the reaction products of hydroxy functional acrylates such as hydroxy ethyl acrylate with isocyanate functional monomers and oligomers such as toluene diisocyanate. Methacrylates are exemplified by cyclohexyl methacrylate, n-hexyl methacrylate, 2-ethoxyethyl methacrylate, isodecyl methacrylate, lauryl methacrylate, stearyl methacrylate, 2-phenoxyethyl methacrylate, isobornyl methacrylate, triethylene glycol dimethacrylate, tetraethylene glycol dimethacrylate, 1,3-butanediol dimethacrylate, 1,4-butanediol dimethacrylate, 1,6-hexanedioldiacrylate, neopentyl glycol dimethacrylate, ethoxylated Bisphenol A dimethacrylate, trimethylol propane trimethacrylate. The preferred methacrylates are 1,6-hexanediol dimethacrylate, stearyl methacrylate, ethoxylated Bisphenol A dimethacrylate and trimethylol propane trimethacrylate. Other methacrylate monomers and oligomers are the reaction products of (meth-)acrylic acid with hydroxyl functional monomers and oligomers such as epoxies, polyesters and polyether polyols. Methacrylate oligomers also desirable are the reaction products of hydroxy functional methacrylates such as hydroxy ethyl acrylate with isocyanate functional monomers and oligomers such as toluene diisocyanate. Typical allyl functional monomers and oligomers are diallyl phthalate, diallyl maleate and allyl methacrylate. The preferred allyl functional compound is diallyl phthalate.

Alpha olefins include $C_8$, $C_{10}$, $C_{12}$, $C_{14}$, $C_{16}$, and $C_{18}$ alpha olefins, which are generally straight-chained hydrocarbons with one vinyl unsaturation in the alpha position. The preferred alpha olefin is the $C_{18}$ alpha olefin 1-octadecene. Vinyl ethers are typified by diethylene glycol divinyl ether and decyl vinyl ether, and vinyl benzenes by styrene, divinyl benzene, and vinyl toluene. Acrylamides are exemplified by N,N-dimethyl acrylamide and preferably are acrylamide functional melamine resins such as those manufactured by Monsanto Inc. under the designations AM-300 and AM-325.

It will be understood, of course, that the alkyd resins which are employed in the invention may be produced from one or a mixture of fatty acids, and polyhydric alcohols. Moreover, the coating composition of the invention may include one or more alkyd resins and one or more vinyl monomers or oligomers, selections from among the various resins and monomers or oligomers being dependent at least in part upon the ultimate properties that the coating composition is desired to exhibit. Free radical initiators which may be blended into the resin compositions of the invention include various well known peroxides and azo compounds. Typical peroxides include benzoyl peroxide, methylethylketone peroxide, 2,4-pentanedione peroxide, di(2-ethyl-hexyl) peroxydicarbonate, di-t-butyl peroxide and t-butyl hydroperoxide.

Azo compounds which are quite stable at room temperature and which decompose when heated to form free radicals include 2,2-azo bis (2,4-dimethylpentanenitrile), 2.2-azo bis (2-methylbutanenitrile), and 2,2-azo bis (2-methylpropanenitrile).

In one embodiment, the invention provides a coating composition package having two parts, one part comprising the blend of the alkyd resin and the vinylically unsaturated monomers or oligomers, and the other part comprising a free radical initiator preferably but not necessarily carried in a solvent solution. If metal driers such as those described below are employed, it is desirable to include the drier in one part of the package and a peroxide catalyst, if this is used, in the second part of the package. Thus, one part of the package may include an alkyd resin, a vinyl monomer or oligomer and a metal drier and the other part may include an organic peroxide. Less desirably, the one part may include the alkyd, the vinyl compound and a peroxide catalyst and the other part may include a metal drier.

In another embodiment, the composition of the invention may be provided as a one-part blend containing the alkyd resin and vinyl monomer or oligomer, the blend including a peroxide catalyst, a peroxide catalyst with complexed metal driers an azo catalyst which exhibits room temperature stability or, most preferred, an azo catalyst and a metal drier. It has been found that the azo catalysts work remarkably well in compositions of the invention in that they store well at room temperature in the presence of the composition without significant reaction or deterioration over a period of, e.g., 21 days, but decompose readily at elevated temperatures to catalyze addition polymerization of the vinyl monomer or oligomer.

Metal salt drying agents such as cobalt naphthenate, cobalt octoate, and manganese naphthenate aid in the decomposition of organic peroxides by acting as reducing agents. The metal driers also increase the oxidative cure of the alkyd portion of the composition. Other metal driers that also beneficially affect the overall cure of the composition include zinc naphthenate, calcium octoate, lead octoate, zirconium octoate, rare earth naphthenates and potassium octoate. It is understood that various metals may be complexed with various organic acids to yield metal driers which will affect the cure of the composition, and metal driers are well known in the field.

The organic peroxides are typically used at 0.3 to 3 parts by weight based on resin solids of the alkyd and vinyl compound(s). The metal driers are typically used at about 0.01 to about 0.5 parts by weight (of metal) based on resin solids of the alkyd and vinyl compound(s). Moreover, the cure of the composition may be completed with any one of various organic peroxides or azo compounds, including metal driers to aid in the cure of the composition as desired.

The coating composition may include pigments such as medium chrome yellow, titanium dioxide, yellow iron oxide and various other pigments as required for the appropriate color and hiding qualities. Various solvents, flow/surface modifying agents, dispersing aids, stabilizers and the like may be utilized to prepare coating compositions. The coating compositions may be formulated, for example, to cure when forced dried at temperatures up to 190° F. (88° C.) or to require baking at temperatures above 190° F., with the appropriate coatings composition including a desired free radical source and metal drier(s) to control the curing characteristics.

The following non-limiting examples are provided for illustrative purposes only. Unless otherwise indicated, parts are given by weight.

EXAMPLE 1

| Preparation of Oil Modified Alkyd Resin | |
|---|---|
| Raw Materials | Parts |
| Refined Soya Oil | 130 |
| Pentaerythritol | 78 |
| Trimethylol ethane | 37 |
| Phthalic Anhydride | 138 |
| Benzoic Acid | 54 |

The ingredients were mixed with 4% xylene as a reflux solvent and heated with agitation under nitrogen gas to 480° F. (249° C.). The reaction mixture was held at that temperature until about 24 parts of water were removed and an acid value of 5-10 was obtained. The resulting polyester alkyd resin was then reduced with xylene to a solids content of 50% by weight and a Gardner-Holdt viscosity of X-Y.

EXAMPLE 2

The alkyd of Example 1 is made into the following coating by combining parts A and B, as follows:

| PART A (Grind portion) | |
|---|---|
| Alkyd of Example 1 | 100 |
| Aromatic 100 | 20 |
| Dispersing Aid[(1)] | 3 |
| Titanium Dioxide | 200 |
| Bentone SA-38[(2)] | 3 |
| Part A Total | 326 |
| PART B (Let down portion) | |
| Alkyd of Example 1 | 270.5 |
| Trimethyolpropane | 39 |

| | -continued | |
|---|---|---|
| | Raw Materials | Parts |
| | Trimethacrylate(3) ("TMPTMA") | |
| | C-14 diol diacrylate(4) | 39 |
| | Xylene | 30 |
| | N-Butyl Alcohol | 9.9 |
| | Hydroquinone | 0.1 |
| | Cobalt octoate (12%) | 0.6 |
| | Manganese octoate (6%) | 1.2 |
| | Dimethyl aniline | 2.0 |
| | 10% SF-69(5) | 1.0 |
| | Part B Total | 393.3 |

(1)Disperse Ayd DA-1, Daniel Products Co.
(2)Hectorite Organoclay; NC Chemicals
(3)SR 350, Sartomer Co.
(4)Chemlink 2000, Sartomer Co.
(5)Silicone Oil, General Electric The white paint was catalyzed with methyl ethyl ketone peroxide (DDM-9, 8.9% Active Oxygen, Pennwalt Corporation) at 0.5% by weight based on paint solids, and was coated upon a metal substrate and cured for 40 minutes at 160° F. (71.1° C.) to an initial pencil hardness of 3B. After 24 hours at room temperature, the pencil hardness increased to B. The hardness was measured per ASTM D-3363-74 and run at a dry film thickness (DFT) of 0.0015 inches (0.038 mm). The reported hardness is the pencil gouge hardness. The cured film also had excellent early water spot resistance where a 1-inch diameter drop of water was placed on the cured film immediately after the panel was removed from the oven. The hardness and water resistance properties were compared to a similar coating made with the same resin but replacing the acrylate and methacrylate with alkyd on a solids basis.

| Coating | Initial Hardness | 24-Hour Hardness | Initial Water Resistance |
|---|---|---|---|
| Alkyd | <6B | 5B | Lost Gloss |
| Example 2 | 3B | B | No Effect |

EXAMPLE 3

A yellow high solids paint was made using a urethane acrylate oligomer.

| Raw Materials | Parts |
|---|---|
| PART A (Grind portion) | |
| Duramac 2707(1) | 120 |
| Disperse Ayd DA-1 | 20 |
| Aromatic 100 | 100 |
| Aromatic 150 | 20 |
| Bentone SA-38 | 2 |
| MPA 1078-X(2) | 2 |
| Medium Chrome Yellow | 415 |
| Molybdate Orange | 6 |
| Titanium Dioxide | 9 |
| Yellow Iron Oxide | 26 |
| PART B (Let down | |
| Duramac 2707 | 240 |
| TMPTMA | 60 |
| C-14 Diol Diacrylate | 60 |
| Chempol 19-4883 oligomer(3) | 60 |
| Butyl cellosolve acetate | 50 |
| Aromatic 100 | 25 |
| Cobalt octoate (12%) | 1.0 |
| Manganese octoate (6%) | 2.0 |
| N-Butyl alcohol | 21 |
| Hydroquinone | 0.4 |
| Methyl Ethyl Ketoxime | 0.8 |

| -continued | |
|---|---|
| Raw Materials | Parts |
| 10% SF-69 | 2.0 |

(1)26% oil length alkyd; McWhorter
(2)Rheologic Additive; NL Chemicals
(3)Urethane Acrylate oligomer; Radcure Inc.

The volatile organic content (VOC) of the paint of Example 3 was measured as 3.15 lbs/gal. (377 g/l) by ASTM test D-3960-81. The paint, catalyzed with MEK peroxide (DDM-9) at a weight concentration of 0.35% based on the total paint, was coated on metal panels to a dry film thickness of 0.0015 inches (0.038 mm) and cured for 40 minutes at 140° F. (60° C.). The resulting coating was characterized by a pencil hardness of HB. The paint of Example 3 exhibited superior properties of hardness and resistance to various liquids when compared to a similar control paint not containing acrylates, as shown in the following Table 1:

TABLE 1

| Coating | Initial Hardness | Twenty-Four Hour Resistance(1) to | | | |
|---|---|---|---|---|---|
| | | Water Resistance | Antifreeze(2) | Unleaded Gasoline | Diesel Fuel |
| Ex. 3 | HB | No Effect | No Effect | No Effect | Slight Discoloration |
| Control | 6B | Loss of Gloss | Loss of Gloss | Blistering, Loss of Gloss | Severe Discoloration |

(1)Two-hour spot test on panels coated, cured and aged for 24 hours.
(2)50% ethylene glycol antifreeze, 50% water

EXAMPLE 4

Vinyl Compound Comparisons

Various paints were made using the following formula:

| Raw Materials | Parts |
|---|---|
| Grind Portion (Part A) | |
| Duramac 2633(1) | 95 |
| Disperse Ayd DA-1 | 3 |
| Aromatic 100 | 45 |
| SA-38 | 3 |
| Titanium Dioxide | 306 |
| Part A Total | 452 |
| Let down portion (Part B) | |
| Duramac 2633 | 407.5 |
| Candidate Vinyl Compound(s) (see Table 2) | 130 |
| Cobalt Octoate (12% Co) | 2.1 |
| Manganese Octoate (6% Mn) | 2.1 |
| Hydroquinone | 0.2 |
| N-Butyl Alcohol | 20 |
| Aromatic 100 | 100 |
| SF-69 | 0.2 |
| | 662.1 |

(1)35% oil length alkyd; McWhorter

The paints were subjected to pencil hardness, water spot resistance and resistance to xylene. Results are reported in Table 2.

TABLE 2

| Candidate Example Vinyl Compound(s) | Initial Pencil Hardness | 1-Hour Water Spot Resistance | Xylene Double Double Rubs to Failure |
|---|---|---|---|
| a. Control, Duramac 2633 Alkyd | 6B | Ring Formation | 10 |
| b. 1-Octadecene(1) | 6B | Slight Ring | 17 |

TABLE 2-continued

| Candidate Example Vinyl Compound(s) | Initial Pencil Hardness | 1-Hour Water Spot Resistance | Xylene Double Double Rubs to Failure |
| --- | --- | --- | --- |
| c. 50% 1-Octadecene, 50% TMPTMA | 5B | No Effect Formation | 70 |
| d. Diallyl Phthalate[(2)] | 6B | Slight Ring Formation | 17 |
| e. 50% Diallyl Phthalate 50% TMPTMA | 4B | No Effect | 73 |
| f. Diethylene Glycol Divinyl[(3)] Ether (DGDE) | 4B | No Effect | 27 |
| g. 50% DGDE, 50% TMPTMA | 2B | No Effect | 200+ |
| h. Vinyl Terminated Butadiene Resin[(4)] ("VTBN") | 6B | No Effect | 56 |
| i. 50% VTBN, 50% TMPTMA | 6B | No Effect | 200+ |
| j. Acrylamide AM-300[(5)] | 4B | No Effect | 94 |
| k. 50% AM-300, 50% TMPTMA | 3B | No Effect | 200+ |
| l. Acrylated Epoxy Celrad 3800 | 2B | No Effect | 200+ |
| m. 50% Celrad 3800[(6)] 50% TMPTMA | B | No Effect | 200+ |
| n. 50% TMPTMA 50% Duramac-2633 | 2B | No Effect | 150 |
| o. TMPTMA | B Cuts | No Effect | 200+ |

[(1)]1-Octadecene (C-18 alpha olefin); Ethyl Corporation
[(2)]Diallyl Phthalate; FMC Corporation
[(3)]Diethylene Glycol Divinyl Ether; GAF Corporation
[(4)]Vinyl Terminated Butadiene Resin, 1300 × 22 Hycar Resin; B. F. Goodrich
[(5)]AM-300; Monsanto Company
[(6)]Celrad 3800; Celanese Corporation The paint specimens were catalyzed with 0.4% by weight of MEK peroxide (DDM-9), were coated upon steel panels to a dry film thickness of 1.5 mils (0.038 mm), and were tested after curing at 40 minutes at 180° F. The 1-hour water spot resistance test requires a 1-inch diameter drop of water to be placed on the cured film within 15 minutes of panel removal from the oven, and the panel is examined one hour later. The xylene double rubs test tests early chemical resistance; a cloth saturated with xylene is manually rubbed across the panel until the paint film is rubbed off.

EXAMPLES 5-8

Single Package Coatings

The paint of Example 3 was prepared, excluding the cobalt octoate and manganese octoate driers. To this paint may be added the following curing agents to produce stable, one-package coating compositions:

| Example 5 | Vazo 67 (2,2'-azobis (2-methylbutanenitrile)) |
| --- | --- |
| Example 6 | Vazo 67 (0.4% by weight), 12% cobalt octoate (0.08% by weight), and 6% manganese octoate (0.16% by weight) |
| Example 7 | MEK Peroxide (DDM-9) 0.4% by weight |
| Example 8 | MEK peroxide (DDM-9) at 0.4% by weight, 12% cobalt octoate at 0.08% by weight based on the weight of paint, and 6% manganese octoate at 0.16% by weight of paint. The drier solutions are complexed with 0.24% methyl ethyl ketoxime by weight before addition to the paint. |

The coatings of Examples 6 and 8 were coated on metal panels and cured for 40 minutes at 230° F. (110° C.) to a pencil hardness of HB, and the coatings of Examples 5 and 7, similarly coated, were cured for 20 minutes at 300° F. (149° C.) to a pencil hardness of 2B.

The single package coatings of Examples 5 and 8 did not significantly change after aging at room temperature for three weeks.

While a preferred embodiment of the present invention has been described, it should be understood that various changes, adaptations and modifications may be made therein without departing from the spirit of the invention and the scope of the appended claims.

What is claimed is:

1. A resinous coating composition comprising a blend of
   (a) from about 15% to about 85% by weight, based upon the weight of the blend, of a fatty acid-modified polyester resin having an oil length ranging from about 15% to about 27%; and
   (b) from about 85% to about 15% by weight, based upon the weight of the blend, of an addition polymerizable monomer or oligomer having vinyl unsaturation and capable of undergoing polymerization under free radical initiating conditions.

2. The coating composition of claim 1 including an effective quantity of a room temperature-stable azo free radical initiator.

3. The coating composition of claim 1 in which the polyester resin is substantially free of groups having alpha-beta ethylenic unsaturation.

4. The coating composition of claim 1 containing from about 50% to about 80% by weight, based upon the weight of the blend, of said fatty acid-modified polyester resin and from about 20% to about 50% by weight, based upon the weight of the blend, of said addition polymerization monomer or oligomer having vinyl unsaturation.

5. A kit for preparing a resinous coating composition comprising, as a first part, from about 15% to about 85% by weight, based on the weight of the blend, of a fatty acid-modified polyester resin having an oil length ranging from about 15% to about 27%; and from about 85% to about 15% by weight, based on the weight of the blend, of an addition polymerizable monomer or oligomer having vinyl unsaturation and capable of undergoing polymerization under free radical initiating conditions, and a second part comprising an effective quantity of a free radical initiator to catalyze addition polymerization of said addition polymerizable monomer or oligomer.

6. The kit of claim 5 wherein the free radical initiator comprises an organic peroxide.

7. The kit of claim 6 wherein the first part includes a metal salt drying agent.

8. The kit of claim 6 wherein the first part includes a complexed metal salt drying agent.

9. The kit of claim 6 wherein the first part contains an oxime-complexed metal salt drying agent.

10. The kit of claim 5 wherein said second part includes an effective quantity of a room temperature stable azo free radical initiator.

11. A one-part resinous coating composition comprising a blend of:
   (a) from about 50% to about 80% by weight, based upon the weight of the blend, of a fatty acid-modified polyester resin having an oil length ranging from about 15% to about 27%;
   (b) from about 20% to about 50% by weight, based upon the weight of the blend, of an addition polymerizable monomer or oligomer having vinyl unsaturation and capable of undergoing polymerization under free radical initiating conditions; and (c) an effective quantity of a room temperature stable free radical initiator sufficient to initiate polymerization of said addition polymerizable monomer or oligomer.

12. The coating composition of claim 11 wherein said free radical initiator comprises an azo catalyst.

13. The coating composition of claim 12 including a complexed salt drying agent.

14. The coating composition of claim 12 including an oxime-complexed metal salt drying agent.

15. The coating composition of claim 11 in which said free radical initiator comprises an organic peroxide.

16. The coating composition of claim 15 including a complexed metal salt drying agent.

17. The coating composition of claim 15 including an oxime-complexed metal salt drying agent.

18. The coating composition of claim 11 in which the polyester resin is substantially free of groups having alpha-beta ethylenic unsaturation.

19. A resinous coating composition comprising a blend of:

(a) from about 15% to about 85% by weight, based upon the weight of the blend, of a fatty acid-modified polyester resin having an oil length in the range of from about 15% to about 35% and free of pendant groups providing alpha-beta ethylenic unsaturation; and (b) from about 85% to about 15% by weight, based upon the weight of the blend, of an addition polymerizable monomer or oligomer having vinyl unsaturation and capable of undergoing polymerization under free radical initiating conditions.

20. The resinous coating composition of claim 19 including an effective quantity of a free radical initiator.

21. The resinous coating composition of claim 20 in which the free radical initiator comprises an organic peroxide.

22. The coating composition of claim 21 including a metal salt drying agent.

23. The coating composition of claim 21 including a complexed metal salt drying agent.

24. The coating composition of claim 21 including an oxime-complexed metal salt drying agent.

25. The resinous coating composition of claim 19 including an effective quantity of a room temperature-stable azo free radical initiator.

26. The coating composition of claim 20 in which said addition polymerizable monomer or oligomer comprises an acrylate or methacrylate monomer.

27. A one-part, room temperature-stable, rapid curing alkyd coating composition comprising a blend of (a) from about 15% to about 85% by weight, based upon the weight of the blend, of a fatty acid-modified polyester resin free of pendant groups providing alpha-beta ethylenic unsaturation and having hydroxyl functionality and an oil length in the range of about 15% to about 35%;

(b) from about 85% to about 15% by weight, based upon the weight of the blend, of an addition polymerizable monomer or oligomer having vinyl unsaturation and capable of undergoing polymerization under free radical initiating conditions; and (c) an effective quantity of a room temperature-stable free radical initiator.

28. The one-part coating composition of claim 27 wherein the free radical initiator comprises an organic peroxide free radical initiator.

29. The one-part coating composition of claim 28 including a complexed metal salt drying agent.

30. The one-part coating composition of claim 28 including an oxime-complexed metal salt drying agent.

31. The one-part coating composition of claim 27 wherein the free radical initiator comprises a room temperature-stable azo catalyst.

32. The one-part coating composition of claim 31 including a metal salt drying agent.

33. The one-part coating composition of claim 31 including a complexed metal salt drying agent.

34. The one-part coating composition of claim 31 including an oxime-complexed metal salt drying agent.

35. The resinous coating composition of claim 1 wherein said fatty acid-modified polyester resin has an oil length in the range of from about 20% to about 27%.

36. The kit of claim 5 wherein said fatty acid-modified polyester resin has an oil length in the range of from about 20% to about 27%.

37. The coating composition of claim 11 wherein said fatty acid-modified polyester resin has an oil length in the range of from about 20% to about 27%.

* * * * *